Figure 1:
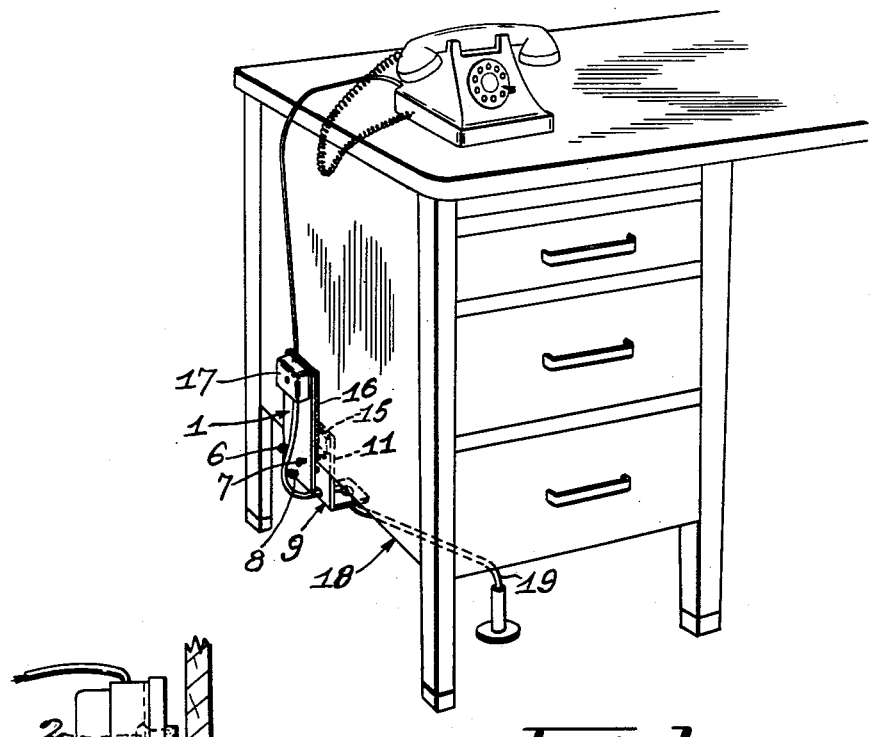
Figure 2:
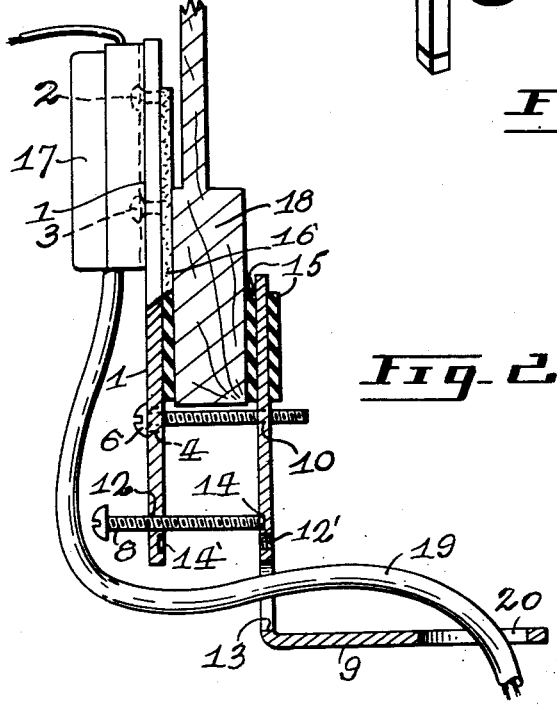

Oct. 31, 1961    J. L. DRYSDALE    3,006,589
HOLDING DEVICE

Filed April 18, 1960    2 Sheets-Sheet 1

Inventor
James L. DRYSDALE
By Robert B. Harmon
Attorney

Oct. 31, 1961  J. L. DRYSDALE  3,006,589
HOLDING DEVICE
Filed April 18, 1960  2 Sheets-Sheet 2
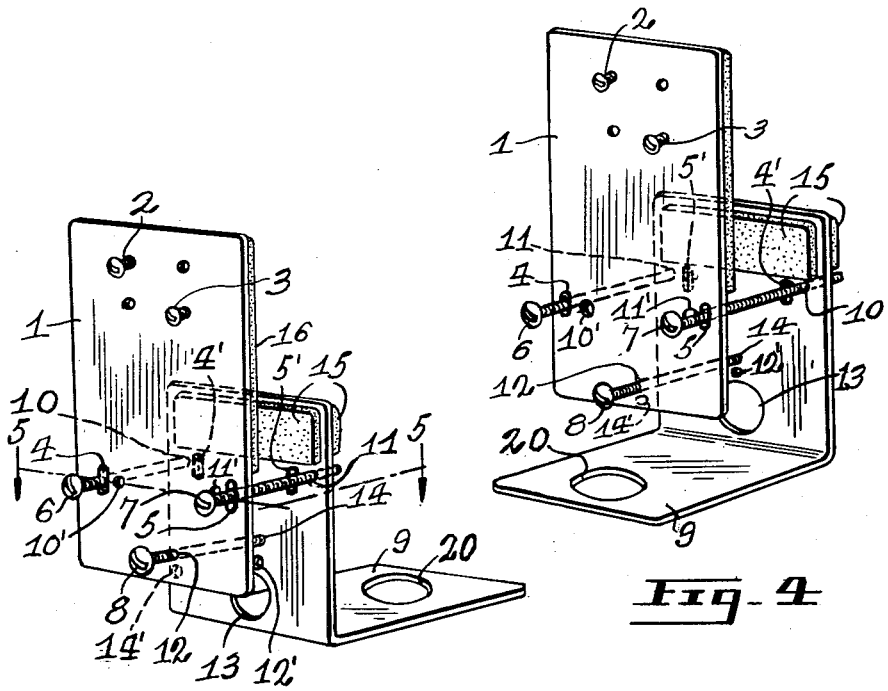
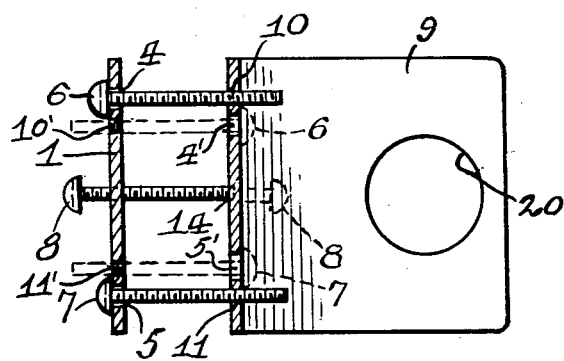
Inventor
James L. DRYSDALE
By Robert B. Harmon
Attorney though which the fastening members 6, 7 extend respectively, bearing surface adjusting screw 8, extending through the thread opening 12 and threaded openings 10', 11'.

In co-operation with plate 1, is the L-shaped plate 9 having thread openings 10, 11 adapted to secure fasteners 6, 7, slotted openings 4', 5', and openings 13, 20 through which an electrical conductor 19 may pass and recess 14 adapted to secure the end of screw 8.

There is also shown in the drawings, friction pads 15, 16 made of a resilient material adapted to hold the device securely to the supporting surface 18, adjusting itself to an irregular supporting surface which may exist.

In the installment of the holding device of the invention, an element, such as a connecting block, is fastened to the plate 1 by fasteners 2 and 3.

The elements 1 and 9 are clamped to the disc 18 by means of fasteners 6, 7 extending through plate 1 to the threaded openings 10, 11, the plates 1 and 9 being adjusted, by virtue of the slotted openings 4, 5, so that the pads 15, 16 only bear on the surface 18. The surfaces of the pads 15, 16 bearing on the surface 18 may be varied by the adjusting screw 8 which extends through the plate 1 and bears in the recess 14 of plate 9. A conductor 19 may be extended through openings 20, 13 to the block 17.

The assembly of the device as shown in FIG. 4, is the same as described heretofore for FIG. 3 except the fasteners 6, 7 extend through the slotted openings 4, 5 on the plate 1 to the threaded openings 10, 11 on plate 9.

What is claimed is:

1. A holding device adapted to be clamped on a supporting surface comprising in combination: a flat plate member, an L-shaped plate member, the two elements being arranged such that, when assembled together the bottom face of the L-shaped member extends a predetermined distance below the bottom edge of the flat plate member, and the top edge of the flat plate member extends a predetermined distance above the top edge of the L-shaped member, apertures and fastening means extending therethrough disposed at the bottom portion of that part of the members where their side faces oppose each other, apertures disposed in the said extended and horizontal portions of the L-shaped plate member.

2. A holding device in accordance with claim 1 in which the first mentioned apertures are slotted.

3. A holding device in accordance with claim 2 having in combination therewith resilient elements disposed between the two members extending over the two opposing faces of the overlapping portions of the said members.

4. A holding device in accordance with claim 1 having in combination means to adjust the bearing surfaces of the two plates on the supporting surface.

5. A holding device in accordance with claim 4 in which said means comprises a threaded member extending through the flat plate and bearing in a recess in L-shaped plate.

References Cited in the file of this patent

UNITED STATES PATENTS

| 971,438 | Gillitt | Sept. 27, 1910 |
|---|---|---|
| 2,921,766 | Bauer | Jan. 19, 1960 |